Sept. 25, 1962    B. MENDEZ ETAL    3,055,445
DRIVE CONTROL AND STEERING MECHANISM
Filed Aug. 23, 1960    3 Sheets-Sheet 1
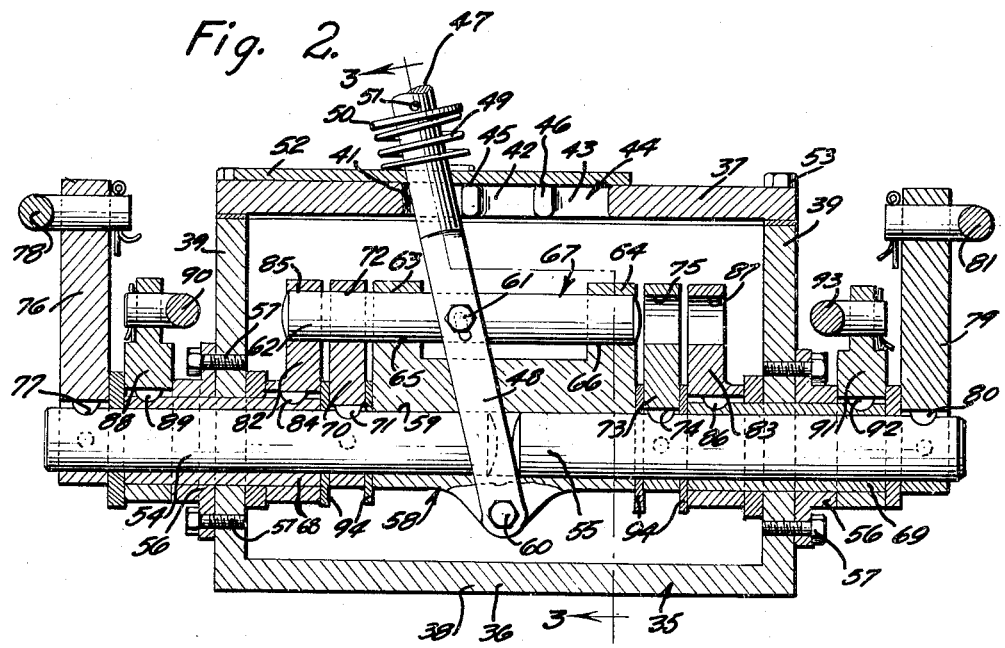
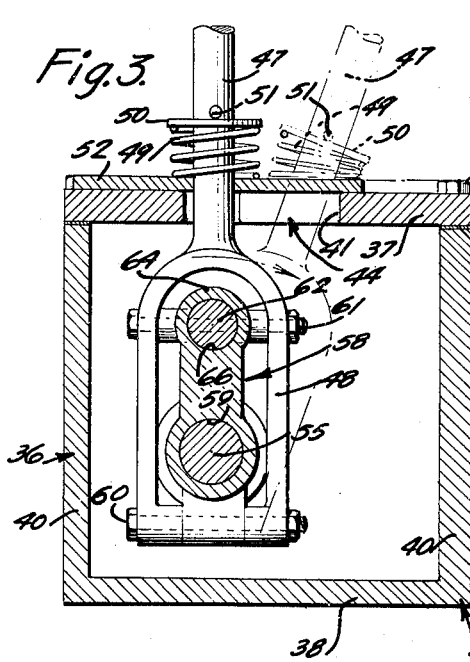
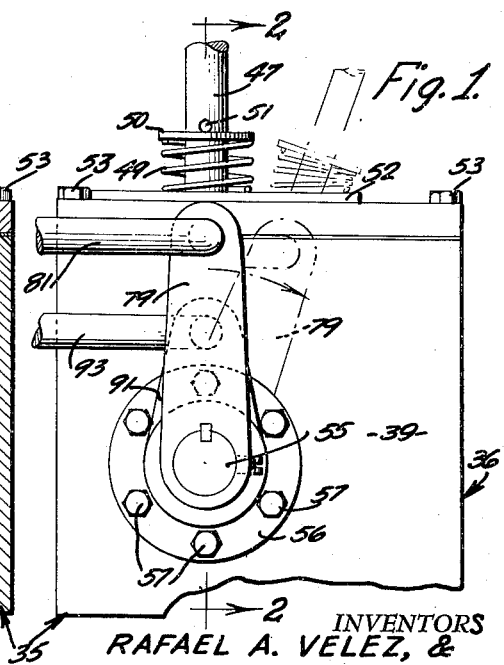
INVENTORS
RAFAEL A. VELEZ, &
BOABDIL MENDEZ
BY *Victor J. Evans & Co.*
ATTORNEYS

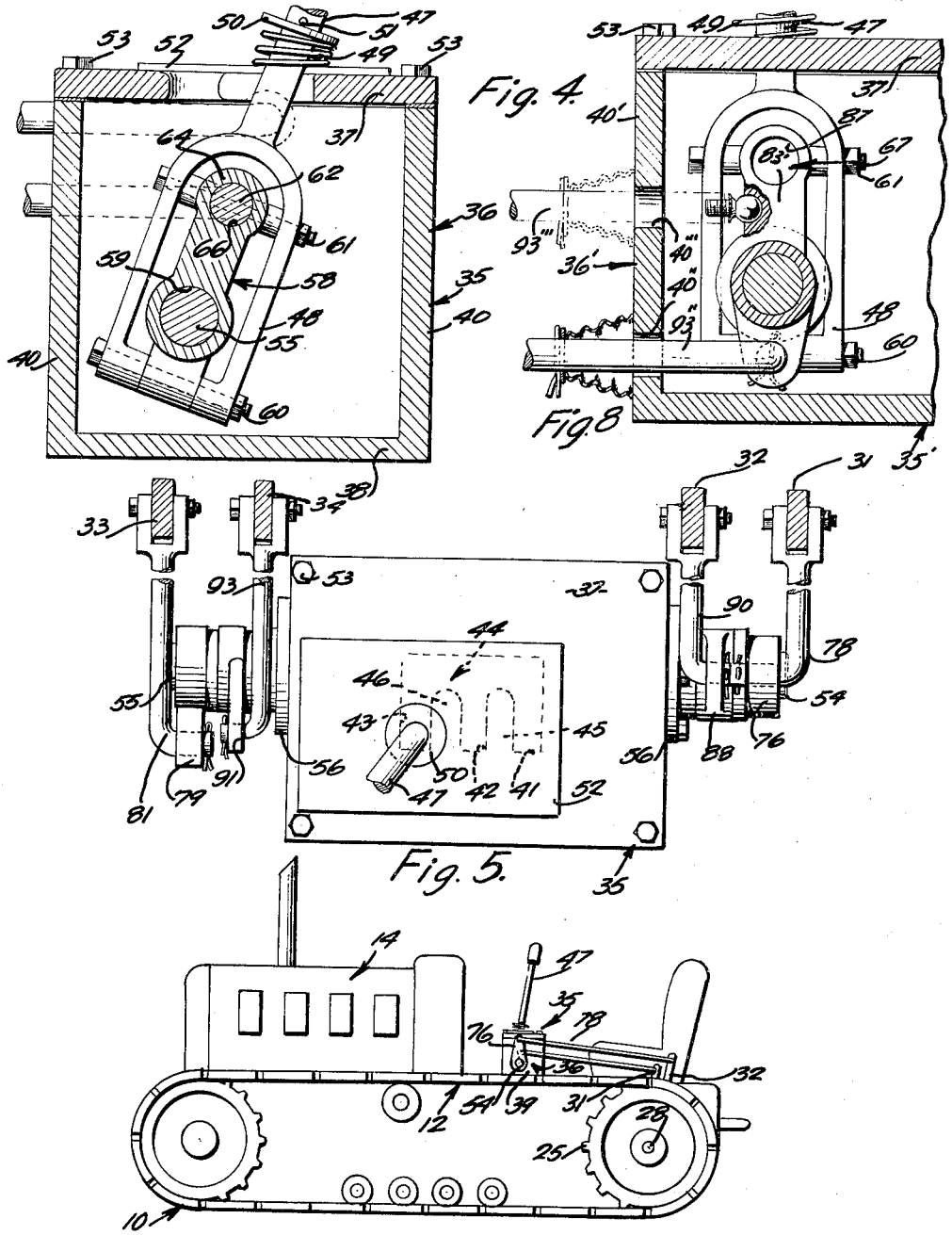

Sept. 25, 1962    B. MENDEZ ETAL    3,055,445
DRIVE CONTROL AND STEERING MECHANISM
Filed Aug. 23, 1960    3 Sheets-Sheet 3
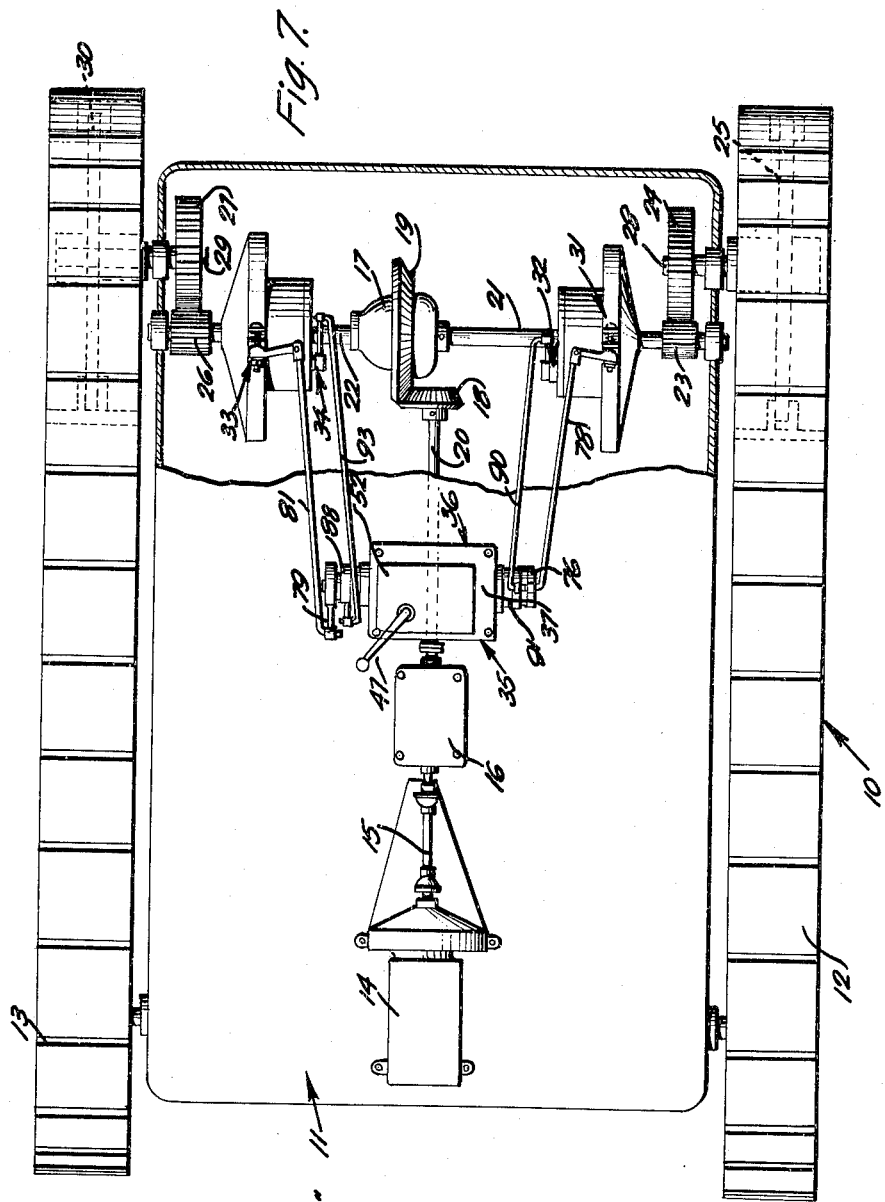
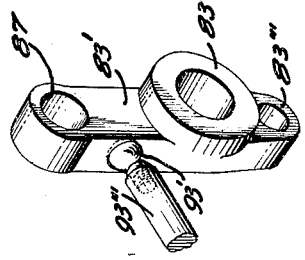
INVENTORS
RAFAEL A. VELEZ, &
BY BOABDIL MENDEZ
Victor J. Evans & Co.
Attorneys ature of the invention is to provide a drive control and steering mechanism which is extremely simple and inexpensive to manufacture.

United States Patent Office 3,055,445
Patented Sept. 25, 1962

3,055,445
DRIVE CONTROL AND STEERING MECHANISM
Boabdil Mendez, Hato Arriba Contract Station, San Sebastian, Puerto Rico, and Rafael A. Velez, 509 Ponce De Leon, Hato Rey, Puerto Rico
Filed Aug. 23, 1960, Ser. No. 51,395
1 Claim. (Cl. 180—6.7)

This invention relates to a vehicle such as a tractor of the type which utilizes endless tracks, and more particularly to a steering mechanism and drive control for such a vehicle.

The object of the invention is to provide a mechanism which will permit a vehicle to be turned to the right or left or stopped by moving only one shift lever so that the necessity of using separate foot pedals or hand levers to control the clutches and brakes of the vehicle is eliminated.

Another object of the invention is to provide a drive control and steering mechanism for a vehicle of the type which utilizes endless tracks, and wherein the mechanism of the present invention is constructed so that a single lever may be manually operated in order to turn the vehicle to the left or right or to stop the vehicle, the mechanism embodying the construction which permits a single shift lever to selectively control the left clutch and left brake, or the right clutch and right brake, or else the single shift lever can be used for simultaneously actuating both brakes as for example when forward motion of the vehicle is to be stopped.

A further object of the invention is to provide a drive control and steering mechanism which is extremely simple and inexpensive to manufacture.

Other objects and advantages will be apparent during the course of the following description.

In the accompanying drawings, forming a part of this application, and in which like numerals are used to designate like parts throughout the same:

FIGURE 1 is a side elevational view illustrating the drive control and steering mechanism of the present invention, and with parts broken away and in section.

FIGURE 2 is a sectional view taken on the line 2—2 of FIGURE 1.

FIGURE 3 is a sectional view taken on the line 3—3 of FIGURE 2.

FIGURE 4 is a view similar to FIGURE 3, but showing the parts in a shifted position.

FIGURE 5 is a fragmentary plan view illustrating the drive control and steering mechanism of the present invention.

FIGURE 6 is a side elevational view of the vehicle such as the tractor equipped with the drive control and steering mechanism of the present invention.

FIGURE 7 is a top plan view of the vehicle such as the tractor, on an enlarged scale, and illustrating the present invention, and with parts broken away and in section.

FIGURE 8 is a fragmentary sectional view illustrating a modification.

FIGURE 9 is a perspective view showing a modified actuator for the device of FIGURE 8.

Referring in detail to the drawings, the numeral 10 indicates a vehicle such as a tractor which includes a frame 11 as well as endless tracks 12 and 13, and the numeral 14 indicates the engine for the vehicle which serves to rotate a shaft 15, and the shaft 15 is adapted to be connected to the usual vehicle transmission 16, FIGURE 7. A shaft 20 is rotated from the transmission 16, and the shaft 20 is operatively connected to the differential 17 through the medium of intermeshing bevel gears 18 and 19. Shafts 21 and 22 are driven from the differential 17, and a gear 23 on the shaft 21 meshes with a gear 24 on an axle 28, and a drive member 25 on the axle 28 is adapted to provide motive force for the endless track assembly 12. A gear 26 on the shaft 22 meshes with a gear 27 on an axle 29, and the axle 29 serves to rotate a drive member 30 which provides power or motive force for the endless track assembly 13. The numeral 31 indicates the left brake, while the numeral 32 indicates the left clutch, in FIGURE 7 the numeral 33 indicates a right brake assembly, and the numeral 34 indicates a right clutch assembly, and these clutch and brake assemblies are of conventional construction.

According to the present invention, there is provided a drive control and steering mechanism which is indicated generally by the numeral 35, and the mechanism 35 embodies a hollow housing or box which is indicated by the numeral 36. As shown in the drawings the housing 36 includes a horizontally disposed top wall 37, a bottom wall 38, ends walls 39, and side walls 40. The top wall 37 is provided with first, second and third spaced apart slots 41, 42, and 43, and the rear portions of these slots communicate with each other through the medium of a space 44, while the front portions of the slots 41 and 42 are separated by a rib 45.

There is further provided a manually movable shift lever 47 which has a U-shape yoke 48 on its lower end, and a coil spring 49 is circumposed on the lower portion of the lever 47, the spring 49 being arranged below a disc 50 which is mounted on the lever by means of a pin 51. A cover member 52 is arranged adjacent the upper surface of the top wall 37 for preventing dust, foreign matter or the like from entering the interior of the housing, and the top wall 37 may be fastened to the adjacent vertical wall as for example by means of securing elements 53.

The numerals 54 and 55 designate a pair of aligned opposed jack shafts which project through the end walls 39 of the housing 36, and these shafts also extend through end members 56 which are fastened to the end walls, as for example by means of securing elements 57. Arranged in the hollow housing 36 is a body member 58, and the body member 58 is provided with a longitudinally extending bore 59 in the lower portion thereof, and the jack shafts 54 and 55 are slidably mounted in the bore 59, FIGURE 2. A pin or bolt 60 pivotally connects the lower end of the yoke 48 on the bottom of the lever 47 to the body member 58, FIGURE 3, and a pin or bolt 61 pivotally connects the upper portion of the yoke 48 to the plunger 62. The upper portion of the body member 58 is cut away as indicated by the numeral 67 so as to define a pair of ears 63 and 64, and these ears 63 and 64 are provided wtih aligned opposted apertures 65 and 66 through which slidably extends the plunger or shaft 62.

The numerals 70 and 73 indicate a first pair of operators which are arranged adjacent the ends of the body member 58, and the operator 70 is keyed to the shaft 54 as at 71, and the upper end of the operator 70 is provided with an aperture or opening 72. The operator 73 is keyed as at 74 to the shaft 55, and the upper end of the operator 73 is provided with an aperture 75. There is further provided a second pair of operators 76 and 79 which are suitably affixed to the upper ends of the shafts 54 and 55. Thus, the operator 76 is keyed as at 77 to the outer end of the shaft 54, and a key 80 connects the inner end of the operator 79 to the outer end of the shaft 55. A tie rod 78 connects the upper end of the operator 76 to the brake 31, and a tie rod 81 connects the upper end of the operator 79 to the brake 33.

There is further provided a first pair of actuators 82 and 83 which are arranged within the housing 36, and the actuator 82 is keyed as at 84 to the sleeve 68, while the actuator 83 is keyed as at 86 to the sleeve 69. The upper end of the actuator 82 is provided with an opening or aperture 85, and the upper end of the actuator 83 is provided with an aperture or opening 87.

The numerals 88 and 91 indicate a second pair of actuators which are arranged outside of the housing, and the actuator 88 is keyed as at 89 to the sleeve 68, and the numeral 90 indicates a tie rod which connects the actuator 88 to the clutch 32, FIGURE 7. The actuator 91 is keyed as at 92 to the sleeve 69, and the tie rod 93 connects the actuator 91 to the clutch 34. As shown in FIGURE 2 for example, spacer members 94 may be interposed between the various separate elements as desired or required.

From the foregoing, it is apparent that there has been provided a drive control and steering mechanism for use with a vehicle having endless tracks such as the tracks 12 and 13. It is to be noted that with the parts arranged as shown in the drawings, power from the engine 14 is transmitted from the shaft 15 to the transmission 16, and this in turn causes rotation of the shaft 20 which operates the differential 17 through the intermeshing bevel gears 18 and 19 so as to rotate the shafts 21 and 22. The shaft 21 causes the gear 23 to turn the gear 24 which in turn rotates the axle 28 that has the drive wheel 25 thereon, whereby the track 12 will be actuated. Similarly rotation of the shaft 22 turns the gear 26 which in turn rotates the gear 27 so as turn the axle 29 in order to rotate the drive wheel 30 which has the track 13 arranged in engagement therewith.

Assuming that the vehicle is traveling in a forward direction, when it is desired to make a right turn, the lever 47 is positioned as shown in FIGURE 7 wherein the lever 47 is positioned in the slot 43 and this will have the effect of causing the vehicle such as the tractor 10 to make a right turn. This is because with the lever 47 positioned in the slot 43, the plunger 52 will be projecting through the apertures 66, 75, and 87, and in addition the body member 58 will be tilted forward on the shafts 54 and 55 so that the operator 73 and the actuator 83 will also be tilted forward due to the forward position of the plunger 62. In view of the fact that the operator 73 is keyed as at 74 to the shaft 55, it will be seen that the forward pivotal or tilting movement of the operator 73 will cause corresponding forward pivotal movement of the operator 79 since the operator 79 is keyed as at 80 to the shaft 55, and since the operator 79 is connected to the tie rod 81 which leads to the right brake assembly 33, it will be seen that the brake assembly 33 will be actuated or applied. In addition at the same time, the pivotal movement of the actuator 83 will rotate the sleeve 69 since the actuator 83 is keyed as at 86 to the sleeve 69 and since the actuator 91 is keyed as at 92 to the sleeve 69, it will be seen that there will be corresponding tilting or forward rocking movement of the actuator 91. The tie rod 93 has one end connected to the actuator 91, while the other end of the tie rod 93 is connected to the clutch 34, so that it will be seen that with the lever 47 positioned in the slot 43, that the brake 33 will be applied and at the same time the clutch 34 will be released, and furthermore at the same time neither the brake 31 nor the clutch 32 will be actuated since the plunger 62 will be out of engagement with the apertures 85 and 72. The effect of this will therefore be to cause the track 12 to continue to be driven, while rotation of the track 13 will be stopped so that the tractor or vehicle 10 will make a right turn.

Similarly, by arranging the lever 47 so that it is in the slot 41 instead of being in the slot 43, the vehicle 10 will make a left turn. This is because with the lever 47 in the slot 41, as for example as shown in FIGURE 2, the plunger 62 is out of engagement with the apertures 75 and 87, and the plunger 62 projects through the apertures 65, 72, and 85 so that with the lever 37 pushed forwardly, the plunger 62 and body member 58 will be tilted as for example from the position shown in FIGURE 3 to the position shown in FIGURE 4 and this will cause the operator 70 to be tilted forward which will rotate the shaft 54 since the operator 70 is keyed as at 71 to the shaft 54, and as the shaft 54 turns, it will move the operator 76 which is keyed to the shaft 54 as at 77. Since the tie rod 78 which leads to the left brake 31 is connected to the operator 76, it will be seen that the left brake 31 will be applied. At the same time, the actuator 82 will be tilted forward and since the actuator 82 is keyed as at 84 to the sleeve 68, it will be seen that the sleeve 68 will be rotated and since the actuator 88 is keyed as at 89 to the sleeve 58, the actuator 88 will be moved, and with the tie rod 90 connected to the actuator 88, it will be seen that the tie rod 90 will be moved in order to actuate the clutch 32. Thus, it will be seen that with the lever 47 in the slot 41, there will be no actuation of the clutch 34 or brake 33, but there will be actuation of the clutch 32 and brake 31 and this will have the effect of simultaneously applying the brakes to the left track 12 and also with the clutch 32 actuated, power to the track 12 will be interrupted, and at the same time there will be no actuation of the clutch 34 and brake 33 so that the track 13 can continue to rotate which will result in the vehicle 10 making a left turn.

In addition, the lever 47 can be positioned to the slot 42 which will cause both brakes 31 and 33 to be actuated. This is because when the lever 47 is moved into the slot 42, the yoke 48 on the lever will cause the plunger 62 to be tilted or moved forwardly, and it is to be noted that when the lever 47 is in the center slot 42, the plunger 62 will be centered so that the ends of the plunger 62 will be out of engagement with both the aperture 85 as well as the aperture 87, but nevertheless the ends of the plunger 62 will be projecting through both the apertures 72 and 75 so that as the lever 47 is pushed forward into the slot 42, the body member 58 will be rocked or pivoted and at the same time the pair of operators 70 and 73 will be pivoted and since these operators are keyed to the shafts 54 and 55, these shafts will both be pivoted or rotated which in turn will move the pair of operators 76 and 79 to simultaneously apply both brakes through the medium of the pair of tie rods 78 and 81.

By moving the lever 47 back into the space 44 to the rear of the slot 42, none of the brakes or clutches will be applied so that with power being transmitted through the previously described mechanism from the engine 14, it will be seen that both tracks 12 and 13 will be rotated whereby the vehicle can be driven forward in the usual manner. Reversing of the vehicle is controlled from the transmission 16 by a conventional reversing mechanism.

The cover 52 moves on the top wall 37 as the lever 47 is shifted, and the spring member 49 helps maintain the lever 47 immobile in its adjusted position. The cover 52 acts as a dust cover to prevent foreign matter or the like from entering the interior of the housing.

It will therefore be seen that according to the present invention a single lever 47 can be used for actuating the various brakes and clutches so that it is not necessary to have a plurality of foot pedals or hand levers for actuating the brake and clutches since the mechanism 35 including the lever 47 provides a convenient means whereby the only one member or lever is required to be moved in order to actuate the various brakes and clutches so that a highly practical and unique method or means is provided for controlling the drive and steering of a vehicle such as the vehicle 10.

The parts can be made of any suitable material and in different shapes or sizes.

It is to be noted that the rib 45 separates the slots 41 and 42, and the rib 46 separates the slots 42 and 43, while the rear ends of these slots 41, 42, and 43 are interconnected by the space 44. This arrangement serves to insure that when the lever 47 is shifted from one slot to another it is necessary to move the lever rearwardly and then through the space 44 to its desired location. As the lever 47 shifts, the cover member 52 moves therewith.

In the present invention one lever, namely the lever 47 is all that is necessary to control the steering of a vehicle. When the lever 47 is in the front of the slot 42, the mechanism is in full braking position so that forward motion of the vehicle is stopped, and this full braking is an important advantage over previous or prior art devices used on similar vehicles. In addition when the stick or lever 47 is moved to the right and positioned in the slot 43, the vehicle will turn to the right, and when the lever 47 is moved to the left and positioned in the slot 41, the vehicle will turn to the right. The mechanism 35 is ruggedly constructed and the parts are arranged so that safe and dependable operation thereof is provided. The mechanism of the present invention can be used also on other types of vehicles besides those which employ endless tracks, and for example the mechanism is adapted to be used on tractors or the like which have rear wheels providing the driving force or power for operation thereof. Thus, according to the present invention a vehicle such as a tractor can be steered by means of one single lever. Suitable thrust washers or spacers can be used to maintain the various elements or parts separated as desired. The housing or box 36 may be supplied with a suitable lubricant such as oil, and as previously stated, when the lever 47 is moved to the right, the vehicle turns to the right, and when the lever is moved to the left the vehicle turns to the left, and when the lever is shifted to the center position both the tracks or chains are stopped so as to bring the tractor to a full stop. The present invention is applicable to any type of vehicle or tractor which is steered by brakes and clutches. The box or housing 36 may be made in different shapes or sizes as desired. The brakes can be applied without operating the clutches, and the top wall 37 may be flat or it may be round, but in either case the movable cover 52 is adapted to travel over the top wall to keep dust, water and the like out of the interior of the housing or box.

Referring now to FIGURES 8 and 9 of the drawings, the numeral 35' indicates a modified drive control and steering mechanism which includes a hollow housing or box 36', and the box 36' includes a side wall 40' which is provided with openings such as the openings 40" and 40'", FIGURE 8. The shift lever 47 has the same construction as previously described, and a modified actuator 83' is used instead of or in lieu of the previously described actuator 83, it being understood that a pair of the actuators such as the actuators 83' are adapted to be used although a description of one will suffice for a description of both. The actuator 83' has an opening 87 in the upper end thereof, and an apertured shoulder 83" is arranged on the actuator 83', FIGURE 9, and there is provided in the lower end of the actuator 83' an extension which has an aperture or opening 83'" therein. A rod 93" is adapted to extend through the opening 40", and the rod 93" is adapted to be connected to the apertured portion 83'" on the lower end of the actuator 83'. Furthermore, if desired a rod 93'" is adapted to extend through the opening 40'", and the rod 93'" may be connected to the actuator 83' by means of a swivel joint or ball and socket connection 93'.

In the construction of FIGURES 8 and 9, the actuator such as the actuator 91 is not needed since the rod such as the rod 93" or 93'" is directly connected between a clutch assembly such as the clutch assembly 34, whereby as the actuator 83' is moved, the rod 93" or 93'" will be moved in order to actuate the clutch such as the clutch 34. The rod 93" is adapted to be used when the clutch 34 is to be actuated by a pulling action or motion, while the rod 93'" can be used as for example when a pushing action is being utilized to actuate the clutch. Except for this feature, the remaining portion of the apparatus is the same as previously described so that for example the brakes 31 and 33 are actuated in the same manner as previously described, but in FIGURES 8 and 9 a different means of actuating the clutches is provided.

What is claimed is:

In a vehicle including a pair of endless tracks, a drive shaft operatively connected to each of said tracks, a clutch controlling each of said shafts, and a brake controlling each of said shafts, the improvement consisting in providing a control mechanism for said brakes and clutches, said control mechanism comprising a housing including end walls and a top wall, there being first, second, and third spaced parallel slots in said top wall, the rear portions of said slots communicating with each other, an upright lever projecting through said top wall and being selectively movable into and out of said first, second, and third slots, an inverted U-shaped yoke within said housing and carried by the lower end of said lever, a pair of rotatable jack shafts arranged in end to end relation and disposed with a portion of each shaft adjacent one end within said housing and a portion of each shaft adjacent the other end projecting through the adjacent housing end wall, an upright body member in said housing, a pair of spaced apart ears on the upper end of said body member, each of said ears being provided with an aperture, said apertures being in alignment, there being a horizontally disposed bore in the lower end portion of said body member receiving therein the adjacent end portions of each of said jack shafts, said yoke having the lower end thereof pivotally connected to said body member for rocking movement toward and away from each of the housing end walls, a horizontally disposed plunger slidably mounted in said ear apertures, means pivotally connecting said plunger to said yoke, a rotatable sleeve extending through each of said end walls and being circumposed about the adjacent portion of the adjacent jack shaft, an upright operator adjacent each end of said body member, each of said operators having the lower end thereof fixed to the adjacent jack shaft and having an aperture in the upper end for the insertion thereinto and withdrawal therefrom of the adjacent end portion of said plunger, another operator having one end fixed to the projecting end portion of each of said jack shafts, a tie rod connecting the other end of each of said another operator to one of the driving shaft brakes, an upright actuator disposed within said housing on the side of each of the first mentioned operators remote from said body member, each of said actuators having the lower end thereof fixed to the adjacent sleeve, the upper end portion of each of said actuators being provided with an aperture for the insertion thereinto and withdrawal therefrom of the adjacent end portion of said plunger, another actuator having one end fixed to the portion of each sleeve exteriorly of said housing and having the other end operatively connected to one of said drive shaft clutches, said plunger being slidable into the apertures of the operator and actuator adjacent each end of said body member responsive to rocking movement of said lever in the direction toward the adjacent housing end wall and operable upon shifting into said first or third slot to disengage the clutch of one or the other of said drive shafts and simultaneously apply the brakes of said one or the other drive shafts, said lever upon shifting into said second slot being operable to apply the brakes of both drive shafts simultaneously.

References Cited in the file of this patent

UNITED STATES PATENTS

| | | |
|---|---|---|
| 1,413,414 | McDaniels | Apr. 18, 1922 |
| 1,915,772 | Ziegler | June 27, 1933 |
| 1,964,779 | Ziegler | July 3, 1934 |
| 2,159,983 | Colby | May 30, 1939 |
| 2,393,324 | Joy | Jan. 22, 1946 |
| 2,544,831 | Guyton | Mar. 13, 1951 |
| 2,554,313 | Price | May 22, 1951 |
| 2,712,357 | Fulton et al. | July 5, 1955 |
| 2,975,851 | Youmans et al. | Mar. 21, 1961 |